United States Patent [19]
Christensen

[11] 3,760,773
[45] Sept. 25, 1973

[54] GAS GENERATING AND METERING DEVICE AND METHOD

[75] Inventor: Mark Victor Christensen, Menlo Park, Calif.

[73] Assignee: Envirotech Corporation, Menlo Park, Calif.

[22] Filed: Mar. 6, 1972

[21] Appl. No.: 231,979

[52] U.S. Cl. ................ 122/4 R, 73/38, 122/4 A
[51] Int. Cl. ............................................ F22b 1/00
[58] Field of Search ................ 122/4, 32; 73/38

[56] References Cited
UNITED STATES PATENTS
| | | | |
|---|---|---|---|
| 2,826,180 | 3/1958 | Lupfer et al. | 122/4 |
| 3,102,512 | 9/1963 | Broerman | 122/32 |
| 3,244,152 | 4/1966 | Mixon et al. | 122/4 |

*Primary Examiner*—Kenneth W. Sprague
*Attorney*—Thomas S. MacDonald and Robert E. Krebs

[57] ABSTRACT

An apparatus and method for generating a vaporized liquid additive (e.g., water) at an accurately controlled flow rate primarily to accurately meter the formed vapor additive to a carrier gas stream. The apparatus includes a chamber for additive liquid with a gas vent tube having a capillary orifice, a conduit for carrier gas, and a valve assembly interposed between the gas vent tube and carrier gas conduit for opening and closing flow from the former into the latter. Means is provided for heating the chamber to a temperature within a range selected to vaporize the additive liquid at a predetermined vapor pressure. The flow rate past a capillary orifice of a given size of additive vapor formed in the chamber is dependent only upon temperature. The liquid additive is heated to a closely controlled evaporation temperature at which the vaporized material is imparted a selected vapor pressure and viscosity which, in turn, adjusts the flow rate. The additive vapor is metered into a fixed carrier gas stream in proportion to its flow rate, controlled by the evaporation temperature.

6 Claims, 2 Drawing Figures

GAS GENERATING AND METERING DEVICE AND METHOD

BACKGROUND OF THE INVENTION

It is not possible according to commercially available methods to generate a gas at a highly accurate predetermined flow rate from a normally liquid material, such as water. One important use for such a method is to meter the vaporized gas into a carrier gas stream in a closely controlled proportion. In one relatively inaccurate technique, a carrier gas is bubbled through a reservoir of the liquid for entrainment of a portion thereof. In another technique, a concentrated vapor stream such as steam is generated and supplied in a relatively small concentrated stream. However, it is difficult to control the flow rate for a number of reasons such as the tendency of the steam to expand and decrease in temperature with a consequent condensation of the vapor.

SUMMARY OF THE INVENTION AND OBJECTS

It is an object of the present invention to provide a method and apparatus for generating a vaporized liquid at a more accurately controlled flow rate than available in prior art techniques as of the aforementioned types.

It is a particular object of the invention to provide a method and apparatus to accurately meter a vaporized normally liquid additive into a carrier gas stream.

It is a further object of the invention to provide a method and apparatus of the foregoing type in combination with a membrane permeation analyzer to test the membrane permeability to the additive gas.

Other and further objects of the invention will be apparent from the following description taken in conjunction with the accompanying drawings.

In accordance with the above objects, an apparatus is provided including a chamber having a liquid inlet opening and a gas vent tube having a capillary orifice portion with an inner cross-sectional area no greater than about $5 \times 10^{-6}$ cm$^2$. A conduit for carrier gas communicates through a suitable valve assembly to the chamber. The chamber also includes means for heating the chamber to a selected temperature within a range.

For purposes of the present discussion, water will be designated as the liquid additive and water vapor as the vaporized additive. It should be understood that the device and method may be employed with respect to other normally liquid materials with relatively low boiling points, such as alcohols.

Water is supplied to the chamber through the liquid opening to form a reservoir and the chamber is sealed. Thereafter, the liquid is heated to a selected evaporation temperature and the formed vapor is directed through the capillary orifice. The temperature is selected to impart a predetermined pressure and viscosity to the vaporized material to accurately control its flow rate at a desired level through the capillary orifice. As used herein, gas flow rate is measured volumetrically.

In accordance with the present invention, the capillary orifice is selected to be within a range such that the volume of vapor passing through the orifice is directly proportional to the pressure difference across the orifice and inversely proportional to the viscosity of the vapor. With a known pressure at the downstream side of the orifice, normally atmospheric, the pressure differential will be equal to the vapor pressure within the chamber measured in psi gauge. By heating the liquid to a temperature above its boiling point, the vapor pressure and thus the flow rate of the vapor are set by the temperature within the chamber. Once a chamber with a particular orifice has been calibrated for a particular temperature versus flow rate relationship, subsequent runs will yield repeatable results. With a constant carrier gas flow rate, the proportion of additive vapor which is metered into the carrier gas is dependent only upon the vapor flow rate through the orifice.

One particular application for the above device is for the metering of water vapor into a carrier gas which is directed into the upstream zone of a permeation cell separated from a downstream zone thereof by a membrane. The proportion of water vapor may be adjusted to correspond to any desired amount of relative humidity in an environmental gas. The water vapor diffusing from the upstream zone to the downstream zone of the cell is then passed through a detector to determine the additive permeability of the membrane.

DETAILED DESCRIPTION OF THE PREFERRED EMBODIMENTS

Figure 1:
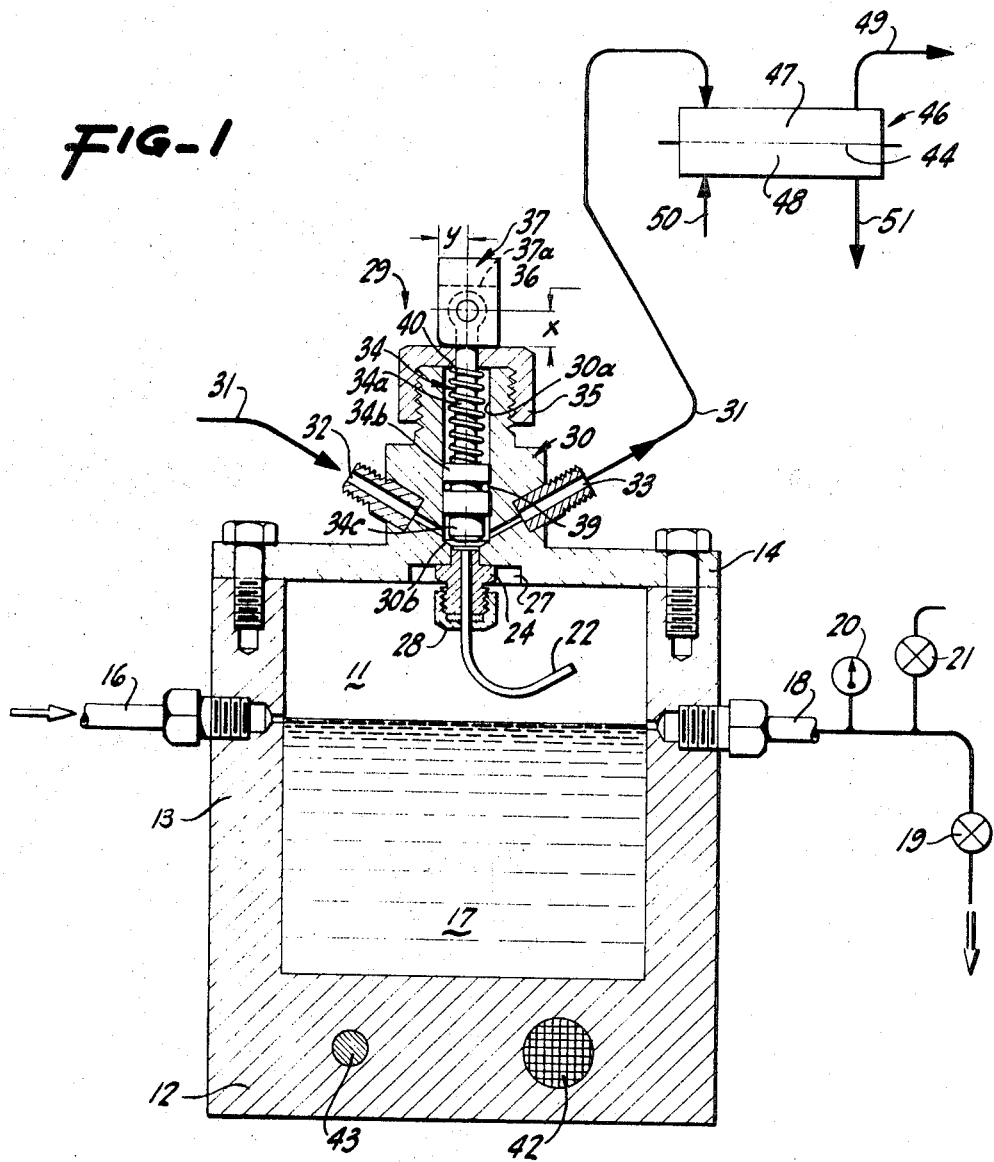
FIG. 1 is a side elevational view of an apparatus according to the invention, partially in cross-section, and with certain features shown schematically.

Referring to FIG. 1, an apparatus according to the invention is illustrated in which a chamber 11 is defined by a bottom wall 12, a cylindrical side wall 13, and a removable top wall 14 bolted in sealing engagement therewith. An inlet conduit 16 is provided for the supply of a reservoir of liquid 17. An outlet conduit 18 serves to remove the overflow of liquid from the chamber which exceeds a predetermined level. A two-way valve 19 for conduit 18 is opened during filling of chamber 11 with liquid and closed during vapor generation as explained hereinafter. Conduit 18 is also provided with a pressure gauge 20 as a safety precaution to monitor the build-up of pressure within the vessel. The operator can determine whether the system exceeds a safe level by monitoring gauge 20 and adjusting the system if pressure build-up is excessive. As a second safety feature, a blow-valve 21 is set to automatically open and release the internal pressure when it exceeds a predetermined safe level.

A gas vent tube 22 is provided in top wall 14 to communicate with chamber 11. Tube 22 is formed in a hook shaped configuration so that the inlet opening projects upwardly away from the liquid reservoir 17 to prevent liquid droplets splashing from the boiling water from entering the tube and altering the vapor flow rate which is maintained constant as explained hereinafter.

Tube 22 is suitably fitted into a plug 24 which is force-fit for firm retention into a recess 27 of wall 14. A guide 28 is threadably received by plug 24 with an annular resilient member therebetween. Tightening guide 28 serves to deform the resilient member to form a gas-tight fit with tube 22.

Figure 2:
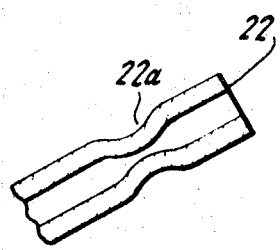
FIG. 2 is an enlarged cross-sectional view of a capillary portion of the gas vent tube of FIG. 1.

As illustrated in FIG. 2, tube 22 includes a constricted portion 22a which is of capillary dimensions selected to be below a maximum cross-sectional area at which the volumetric flow rate past the orifice is directly proportional to the chamber temperature for a given downstream pressure (e.g., atmospheric). For this purpose, the inner cross-sectional area should be no greater than about $5 \times 10^{-6}$ cm$^2$. The area also determines the range of flow rates feasible for the vapor pressure in the chamber. For flow rates on the contemplated order (5 cc/min) the area is preferably in a range of about $3 \times 10^{-8}$ to $1 \times 10^{-6}$ cm$^2$. As explained hereinafter, at such levels the concentration of vapor passing through the orifice is maintained at a sufficiently low level that the flow rate can be controlled with a high degree of accuracy. A suitable technique for forming an orifice of the described dimension is by crimping with a vise or other device.

Valve assembly 29 includes a cylindrical housing 30 with an inner cylindrical wall 30a defining a central opening and an inwardly tapered bottom wall 30b formed integrally with top wall 14. A carrier gas line 31 supplies gas continuously through the valve assembly by passage through inlet and outlet openings 32 and 33, respectively, in housing 30. A cup-shaped cap 35 with a central opening is threadably mounted onto the top of housing 30. Cylindrical movable member 34 is passed through cap 35 and is received within opening 30a. Member 34 includes a circular hole at its upper end, an intermediate shaft 34a, a sliding piston portion 34b, and a cylindrical plug portion 34c with an inwardly tapered lower edge which mates with the bottom wall of opening 30a. An annular groove is provided in piston portion 34b for an O-ring 39 to sealingly engage wall 30a.

Cam member 37 is seated upon the upper surface of cap 35 and includes a journalled shaft 36 which passes through the opening of member 34 and also includes an undercut slot at the depth illustrated by dotted line 37a to permit rotation of cam 37 between the illustrated position and a 90° turn in a counter-clockwise direction. Referring to the position illustrated in FIG. 1, distance X, measured between the center of shaft 36 and the lower cam wall, is greater than distance Y, measured to the side wall for reasons explained hereinafter. Means is provided to continuously urge member 34 downwardly and comprising spring member 40 concentric with shaft 30a and disposed between cap 35 and piston 34b. An annular opening is defined at all times between plug portion 34c and side wall 30a for the continuous passage of carrier gas in line 31 through inlet 32 around the annulus to exit through outlet 33.

Valve assembly 29 includes an open and a closed operating position for gas flowing in tube 22. In the first or open position illustrated in FIG. 1, gas exiting from chamber 11 through gas vent tube 22 flows through an open passageway into the carrier gas line 31. In a second position, not shown, member 34 is moved downwardly to a position at which plug 34c seals the opening at the upper end of gas vent tube 22. This movement is accomplished by rotation of cam 37 counterclockwise 90° as by a handle, not shown, extending in the direction of shaft 36. Since the distance X is greater than distance Y, this rotation lengthens the effective length of member 34 to permit downward movement under the force exerted by spring 40 to firmly seat the bottom of plug 34c on wall 30b to thereby seal the gas from exiting vent tube 22.

Means is provided for heating the chamber to a selected temperature within a range and including a heating element 42 and an operatively associated temperature controller and sensor 43, suitably of the type sold by Dohrmann Division of Envirotech Corportion under the designation Model 65 Controller. The volumetric flow rate vapor through tube 22 is directly dependent upon the temperature within chamber 11. Thus, for accurate control of the gas flow rate at a constant level, it is important that the temperature of the chamber be correspondingly constant. For this purpose, all external walls of chamber 11 are provided with effective heat insulation. After the system is equilibrated to the desired temperature, sensor 43 detects temperature variances in temperature and, in response hereto, automatically alters the amount of heat supplied to element 42 depending upon the direction of variance. Model 65 Controller is a silicon-controlled rectifier which draws increased power upon cooling and decreased power upon heating above the selected level. The sensor is calibrated against a highly accurate thermometer, not shown, placed in cylindrical wall 13. Since the insulation is external to the walls, typically formed of a heat-conductive material such as aluminum, the temperature within each wall is essentially equal to that within the chamber. The thermometer should be extremely accurate, say, to within a variance of 0.1° C. After initial calibration of sensor 43 against the thermometer, temperature readings may be taken directly from the sensor readings. The temperature within the chamber 11 is above the boiling point of the liquid and within a range that produces a safe vapor pressure.

For purposes of the present discussion, water is designated as the liquid additive in reservoir 17. It should be understood that other normally liquid materials with relatively low boiling points, such as alcohols, may also be employed. The carrier gas may be any suitable gas to which an accurately measured quantity of a normally liquid additive is to be added. Common carrier gases include air, oxygen, nitrogen, helium, carbon dioxide and the like so long as the additive is unreactive with the carrier gas.

General procedure in accordance with the present invention includes the filling of chamber 11 through conduit 16 with valve 19 open until water overflows through outlet conduit 18. Thereafter, valve 19 is closed. After calibrating the vapor flow rate-temperature relationship of the system dependent upon the cross-sectional area of constricted portion 22a, as explained hereinafter, heat is supplied to element 42 until the desired temperature for a predetermined flow rate is achieved as indicated by calibrated sensor 43. During this time, carrier gas continuously flows through the system and valve assembly 29 is in a closed position blocking the passageway of vent tube 22.

After equilibration at the selected temperature, cam 37 is rotated clockwise 90° to open the passageway from vent tube 22 into carrier gas line 31. Since the carrier gas is flowing at a constant rate, the amount of water vapor metered into the carrier gas is accurately controlled by the relative flow rates between the carrier gas and water vapor. It requires only a short time interval (e.g., a few seconds) to humidify the carrier gas.

Functioning of the above device is dependent upon the following equation:

$$V.F. = k \, \delta \, P/N$$

Where:
$V.F.$ = volumetric flow rate.
$k$ = geometric constant for the orifice.
$\delta P$ = pressure difference across the orifice.
$N$ = viscosity of the vapor.

The above equation is valid when the inner cross-sectional area of constricted orifice portion 22a is no greater than about $5\times10^{-6}$ cm$^2$. For water vapor additive at a flow rate on the order of, say, 5 cc/minute, it is preferred that the orifice opening be between the ranges of $3\times10^{-8}$–$1\times10^{-6}$ cm$^2$ in area. It is apparent that the pressure drop increases as the cross-sectional area decreases and so the particular orifice dimension should be selected depending upon the contemplated system. Although a single constriction is illustrated, it should be understood that a plurality may also be employed.

In a typical instance, if the carrier gas vents to the atmosphere, the vapor pressure on the downstream side of the orifice will be atmospheric and so the pressure differential across the orifice in the above equation is essentially equal to the vapor pressure within chamber 11 at the selected temperature of operation. With water as liquid 17, by heating the chamber to temperatures within the range of from about 110° to 160° C, water vapor can be metered into the carrier gas at a proportion comparable to a humidity from very low values (e.g., a few percent) to 100 percent relative humidity at carrier gas temperatures from ambient to 100° C. This is accomplished by controlling the vapor pressure of the liquid, i.e., by temperature control, in conjunction with control of the carrier gas flow rate.

The constant, $k$, in the above equation is calculated by measuring the volumetric flow rate at different pressure differentials across the orifice ($\delta P$ values) and corresponding viscosities for the liquid which, in turn, are controlled by the temperature within chamber 11. After calibration, the temperature reading of sensor 43 may be converted directly to flow rate of the gas flowing across the orifice.

Referring again to FIG. 1, one use of the apparatus is illustrated in which the carrier gas is directed to a device for determining the rate of permeation through a membrane 44. The device includes a permeation cell 46 with an upstream compartment 47 and a downstream compartment 48 and means for retaining the membrane therebetween in a gas-tight fit. Carrier gas is supplied to upstream compartment 47 and is vented therefrom through outlet 49 to the atmosphere. A second carrier gas passes through downstream compartment 48 through inlet and outlet openings 50 and 51, respectively. The amount of water vapor diffusing from the upstream zone to the downstream zone is passed from outlet 51 to a detection zone, not shown, to determine the permeability of the membrane. With water as liquid 17, the permeability of membrane 44 to water vapor of a wide range of humidification may be accurately determined.

The details of the above schematically illustrated single permeation cell may be carried out in one, two or three or more interconnected cells and detected, as illustrated in Stephens et al., U. S. Pat. 3,618,361, incorporated herein by reference. Referring to that patent, line 39, FIG. 1, would be comparable to line 31, FIG. 1, of the present application for metering in the additive vapor.

Although the aforementioned device has been described in terms of accurately metering a vaporized normally liquid additive into a carrier gas stream, it should be apparent that it may be employed for generating a vaporized liquid at an accurately controlled flow rate for some other purpose. This would be simply accomplished by sealing off carrier gas inlet 32 and directing the generated gas through outlet 33. Alternatively, a different valve assembly, not shown, could be employed which serves to stop or permit gas flow through the vent tube.

It is also apparent from the foregoing that the type of valve assembly 29 may be varied without departing from the scope of the present invention.

The highly accurate flow rates obtainable by the foregoing method would be primarily useful on a small or laboratory scale for purposes of experimentation rather than in a full scale commercial plant.

I claim:

1. An apparatus for generating a vaporized liquid at an accurately controlled flow rate comprising means forming a chamber having a liquid inlet opening, a gas vent tube communicating with said chamber and having a capillary orifice portion with an inner cross-sectional area no greater than about $5\times10^{-6}$ cm$^2$, valve means for blocking and unblocking gas flow through said vent tube, and means for variably heating said chamber to a predetermined temperature within a range.

2. An apparatus as in claim 1 in which the cross-sectional area of said vent tube orifice is from about $3\times10^{116\ 8}$ to $1\times10^{-6}$ cm$^2$.

3. In an apparatus for accurately metering a vaporized normally liquid additive into a carrier gas stream, means forming a chamber having a liquid inlet opening, a gas vent tube communicating with said chamber having a capillary orifice portion with an inner cross-sectional area no greater than about $5\times10^{-6}$ cm$^2$, a conduit for carrier gas, valve means interposed between said gas vent tube and carrier gas conduit and having a first operating position serving to provide an open passageway therebetween for vaporized additive and a second operating position serving to block said passageway, and means for variably heating said chamber to a predetermined temperature within a range.

4. A method for generating a vapor from a normally liquid material at an accurately controlled flow rate comprising the steps of forming a reservoir of the liquid in an enclosed chamber, heating the liquid to a selected evaporation temperature, directing the formed vapor through a capillary orifice with a cross-sectional area no greater than about $5\times10^{-6}$ cm$^2$, said evaporation temperature being selected to impart a predetermined vapor pressure and viscosity to the vaporized material to accurately control its volumetric flow rate at a desired level through the capillary orifice.

5. A method as in claim 4 in which the generated material is water.

6. A method for accurately metering a vaporized normally liquid additive into a carrier gas comprising the steps of directing a carrier gas through a conduit at an essentially constant flow rate, forming a liquid reservoir of the additive in an enclosed chamber, heating the liquid additive to a selected evaporation temperature, and directing the formed vapor additive through a capillary orifice with a cross-sectional area no greater than about $5\times10^{-6}$ cm$^2$ and into the carrier gas stream, said evaporation temperature being selected to impart a predetermined vapor pressure and viscosity to the vaporized additive to accurately control its volumetric flow rate through the capillary orifice and thus accurately meter the same at a desired level into the carrier gas stream.

* * * * *